Jan. 23, 1962 O. MATTIAT 3,018,451

PIEZOELECTRIC RESONATOR WITH OPPOSITELY POLED RING AND SPOT

Filed Dec. 4, 1958

INVENTOR,
OSKAR MATTIAT

BY Harry M. Saragovitz

ATTORNEY

United States Patent Office 3,018,451

Patented Jan. 23, 1962

3,018,451

PIEZOELECTRIC RESONATOR WITH OPPOSITELY POLED RING AND SPOT

Oskar Mattiat, Santa Barbara, Calif., assignor to the United States of America as represented by the Secretary of the Army Filed Dec. 4, 1958, Ser. No. 778,270
5 Claims. (Cl. 333—72)

This invention relates to electric wave filters, and more particularly to filters, comprising piezoelectric ceramic crystals.

The invention relates more specifically to piezoelectric ceramic resonators designed for use in radio equipment.

In recent years, piezoelectric ceramic materials have found many new applications as electromechanical resonators and transducers. For some purposes, the use of ceramic substances is preferred over pure quartz crystals. Diverse modes of vibration can be induced in various known ceramics by suitably prepolarizing them in different directions, whereas the inherent structure of naturally found piezoelectric elements limits the modes of vibration in number and direction. A thin disk is particularly well suited for use as an electric resonator, because of its excellent characteristics in the radial mode of vibration. A polarized disk responds to all excitations which induce resonant vibrations within the disk, i.e., it responds to excitations which induce the fundamental and several higher overtones. This action is similar to a string of a violin which can be made to vibrate in the fundamental, the first, the second or any higher overtone, depending on the applied excitation force. There are, however, several applications in which it is required that the electric resonator discriminate between resonant modes of vibration. For example, it may be desired to make the resonator respond only to the first overtone and suppress the funamental, the second and all other higher overtones. A conventional method of accomplishing this desired suppression consists in mechanically mounting the disk in such a manner as to impede the undesired overtone resonant vibrations. The design of such a mechanical mounting device, however, is extremely complex and time consuming.

Accordingly, it is an object of this invention to provide an electric resonator capable of suppressing electrically the excitation of neighboring resonant overtones in the radial mode of vibration.

It is a further object of the present invention to improve the coupling efficiency of a first overtone resonator.

It is another object of the present invention to improve the mounting of piezoelectric ceramic resonators.

It is an additional object of this invention to reduce the spurious responses of a piezoelectric ceramic disk resonator.

It is also an object of this invention to provide piezoelectric ceramic resonators suitable for operation in the lower portion of the megacycle frequency range.

These and other objects are obtained by using a thin piezoelectric ceramic disk having, on each main face, a center or a dot electrode, a ring electrode and a conductive path connecting the dot and the ring electrodes. The portions of the disk between the dot electrodes and the ring electrodes are axially polarized in opposite directions. The electrodes on the disk are so dimensioned as to enhance the excitation of the first overtone and impede the undesired overtone resonant vibrations.

The features of this invention which are believed to be novel are set forth with particularity in the appended claims. The present invention itself, both as to its organization and manner of operation, together with further objects and advantages thereof may best be understood by reference to the following description taken in connection with accompanying drawings, in which like reference characters refer to similar parts and in which:

Figure 1:
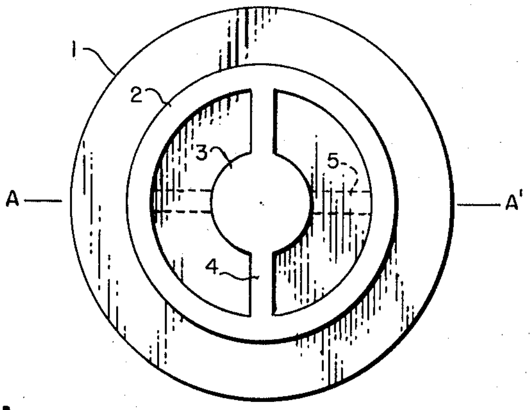
FIG. 1 is a perspective view of one embodiment of a piezoelectric ceramic electric resonator showing the position of the electrodes on the disk.

Referring now to FIG. 1, the piezoelectric disk 1 is made from a ceramic material which may be, for example only, barium titanate or barium titanate mixed with other titanates. The center dot electrode 3, the ring electrode 2, and their respective counterparts on the opposite side of the disk, are formed from any suitable conducting material such as silver, platinum, etc. These electrodes are applied to the disk in any desired fashion, since neither the electrode material nor its manner of application form any part of this invention. The dot and ring electrodes 3, 2 and their counterparts 3', 2' are electrically interconnected by conductors 4 and 5, respectively; these conductors are shown to be perpendicular to each other for reasons which will be explained in more detail in the remainder of the specification. While the electrodes and conductors are very thin in actual practice, their thickness is exaggerated in the drawing for clarity.

Figure 2:
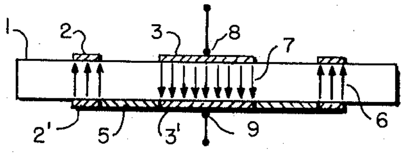
FIG. 2 is a cross-sectional view of the embodiment of FIG. 1, taken along diameter A, A'.

In FIG. 2, the axial prepolarization in the thin disk between ring electrodes 2, 2' and dot electrodes 3, 3' is indicated by arrows 6 and 7, respectively. As shown, the polarization is in opposite directions. Before the formation of conductors 4 and 5 the polarization may be performed by connecting the positive terminal of a suitable direct-current source to electrodes 3, 2' and the negative terminal to electrodes 3', 2. Other methods may be employed to polarize the disk, the only requirement being that the polarization be in opposite directions.

Figure 3:
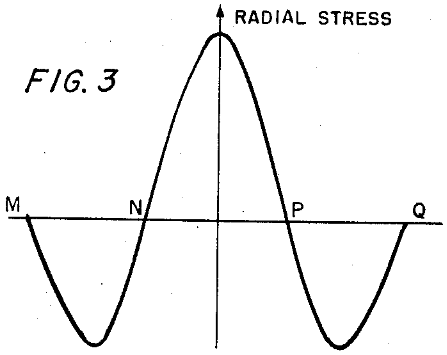
FIG. 3 is a graph showing the distribution of radial stress within the disk of FIG. 1 for first overtone operation.
Figure 4:
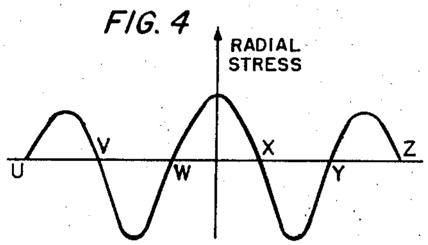
FIG. 4 is a graph showing the distribution of radial stress within the disk of FIG. 1 for second overtone operation.

FIGURES 3 and 4 show the stress distribution in a mechanically vibrating disk at the first and second overtones of the radial mode of vibration, respectively. The center of the disk is taken as the zero point of the X axis and the edges of the disk are plotted to the right and to the left of the center point. In first overtone operation the diameter of the disk is divided in three segments MN, NP, and PQ. There is a vibrational phase difference of 180° between adjacent segments, as shown. The stress falls practically to zero at the ends of the disk. The magnitude of the stress at the center of the disk is somewhat greater than the stress at the center of segments MN and PQ.

Similarly in FIG. 4, there is a vibrational phase difference of 180° between segments and the magnitude of the peak stress at the center of the disk is larger than the magnitude of the peak stresses of segments UV, VW, XY, and YZ.

Figure 5:
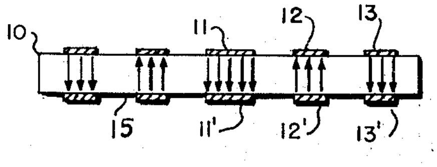
FIG. 5 is a cross-sectional view of another embodiment of an electroded disk for second overtone operation.

FIGURE 5 shows a piezoelectric disk 10 electroded for second overtone operation. Central dot electrodes 11, 11′ and two ring electrodes 12, 13, and 12′, 13′ are provided respectively, on each main face of the disk as shown. The dot and the ring electrodes of each face are interconnected by conductors 14 and 15, only conductor 15 is shown in cross-section. The axial polarization between adjacent electrodes is in opposite directions, as shown. The resonator of FIG. 5 is in all respects similar to the resonator of FIG. 1, except for the additional ring electrode 12.

Figure 6:
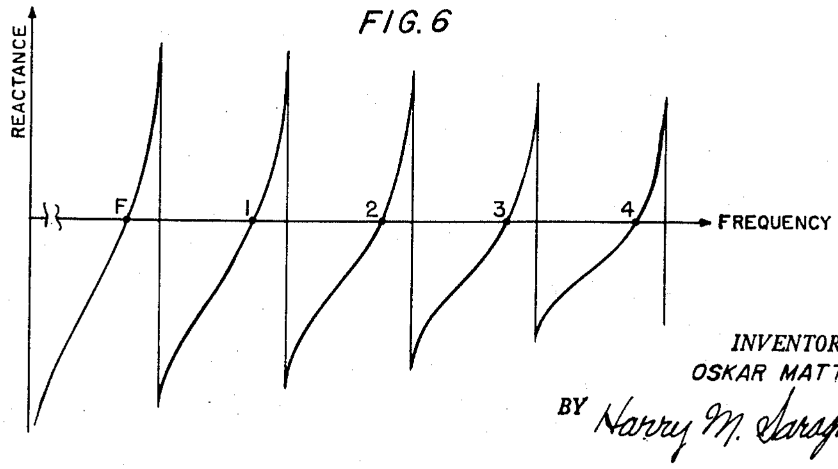
FIG. 6 is a graph showing the reactance vs. frequency curve of a prior art composite band pass filter.

FIG. 6 shows a reactance vs. frequency curve of a prior art composite band-pass filter. Resonance occurs at a large number of distinct frequencies as F (fundamental), first, second . . . overtones on the frequency axis. When the resonator is used in a bandpass filter network the attenuation characteristic of the network is determined by the number and location of the resonant points on the reactance curve, as is well known to those skilled in the art. It is greatly desirable, however, in designing such filters to be able to control the occurrence of resonance within the disk. Often, it is required that there be only one resonant frequency within the resonator to eliminate the spurious responses of the disk. The manner in which this is accomplished in accordance with the present invention, will be hereinafter described.

In operation, the excitation voltage signal, whose frequency corresponds to the first overtone is conveniently applied to input junctions 8 and 9. When this applied electric field is parallel and in the same direction as the polarization within the disk, the vibrational radial stress is positive. Similarly, when the electric field is parallel but in opposite direction to the polarization the stress is negative. The terms "positive" and "negative," when used in conjunction with stresses, merely indicate that the stresses are of the same nature but of opposite kind, as, for example, in the relationship of a contraction to an expansion. Therefore, when the applied voltage to electrodes 2, 3 is positive with respect to their counterparts 2′, 3′, the vibrational stress will be positive in segment NP (electric field and polarization in the same direction), and negative in segments MN and PQ (electric field and polarization in opposite directions). When the applied voltage to electrodes 2, 3 is negative with respect to their counterpart electrodes 2′, 3′, the signs of the vibrational stresses are reversed. Upon the application of a high frequency voltage, the stresses alternate in signs at a rate equal to the applied frequency. At resonance the amplitudes of these vibrational stresses are greatly intensified as shown in FIG. 3.

From the above description, it can readily be seen that the location of interconnected electrodes on the disk at points of maximum vibrational stress and the reversal of direction of polarization, as shown in FIGURES 1 and 2, greatly enhance the coupling efficiency of the first overtone electric resonator. Conversely, the probability of other overtones to excite the disk is greatly reduced, since the maximum points of vibration for other overtones will not correspond to the relative radial positions of the electrodes. Therefore, the reactance of the disk of FIG. 1 as a function of frequency will have only one zero point at a frequency corresponding to the first overtone, instead of the undesired plurality of zero points as shown in FIG. 6.

For second overtone operation, an additional ring electrode is provided, as shown in cross-section in FIG. 5. The polarization is reversed in direction in adjacent electrodes so as to induce alternating plus and minus stresses, as required by the radial stress distribution curve of FIG. 4. The arrangement of FIG. 5 insures the excitation of the disk in its second-overtone mode of radial vibration. By locating the interconnected electrodes at the peak points of maximum vibration, the second overtone resonator inherently and automatically discriminates against the fundamental and all other overtones. The theory of operation of the second overtone disk is in all respects similar to that of the first overtone resonator described previously in conjunction with FIG. 1 and is believed to be sufficient for an understanding of the operation of the resonator of FIG. 5.

The present invention is not limited to any particular overtone operation. In general for *n*th overtone operation, *n* ring electrodes and one center electrode are provided on each main face of the disk. Adjacent segments are polarized in opposite directions, the segments being interconnected by perpendicular conductors, such as 4 and 5 in FIG. 1. Conductors 4 and 5 are perpendicular to each other in order to minimize the inter-conductor capacitance; otherwise, this capacitance which is appreciable at high frequencies induces spurious responses within the resonator.

Another inherent advantage of the present invention is to permit the utilization of greater diameter disks than would otherwise be possible. For example, disk resonators operating at their fundamental mode of 1 megacycle have a diameter of only 0.080 inch, whereas, for the same frequency at the first overtone operation, the diameter is about 2.4 times as large. Larger diameter disks are more convenient to manufacture and easier to handle.

A further advantage of this invention resides in the fact that the electrodes and the connectors may be stamped in a single operation, thus reducing the necessity for soldering wires to the electrodes and facilitating the mechanical mounting of the resonator. Moreover, by reversing the direction of polarization between adjacent segments and by interconnecting on each face the dot and the ring electrodes, there is eliminated the need for interconnecting with wires the top electrodes and their bottom counterparts, which would upset the free resonant vibrations and cause spurious responses within the disk.

What is claimed is:

1. A piezoelectric ceramic high frequency electric resonator dimensioned to operate at an overtone of its fundamental resonant frequency and having two main faces, an outer and an inner electrode on each main face, the ceramic body between the inner electrodes being axially polarized in one direction and between the outer electrodes in an opposite direction, said outer and said inner electrodes being located on the vibrational antinodes induced by said overtone, and means for interconnecting said inner and said outer electrodes on each of said main faces.

2. The resonator in accordance with claim 1, wherein said last named means are two perpendicular disposed electric conductors.

3. A piezoelectric disk-shaped high frequency electric resonator dimensioned to operate at an overtone of its fundamental resonant frequency and having two main faces, a dot and a ring electrode symmetrically arranged on each main face, the portion of the disk between the dot electrodes being axially polarized in one direction and the portion of the disk between the ring electrodes being axially polarized in an opposite direction, said outer and said inner electrodes being located at the vibrational antinodes induced by said overtone and means for interconnecting said dot electrode and said ring electrode on each of said main faces.

4. The resonator in accordance with claim 3, wherein said last named means are two perpendicular electric conductors.

5. A thin piezoelectric polarized ceramic disk resonator having two main faces, said disk being dimensioned to operate at a single overtone of its fundamental resonant frequency; two dot electrodes, one placed at the center of one of said faces and the other placed at the center of the other of said faces; a plurality of ring electrodes symmetrically arranged on each of said faces and concentric with said dot electrodes, said dot and ring electrodes being placed at the antinodes associated with said overtone; a narrow conductive strip on each of said faces for interconnecting all of the electrodes on each face, said strips being mutually perpendicular on the respective faces; said polarization being in opposite directions between consecutive electrodes.

References Cited in the file of this patent

UNITED STATES PATENTS

| | | |
|---|---|---|
| 2,262,966 | Rohde | Nov. 18, 1941 |
| 2,373,431 | Sykes | Apr. 10, 1945 |
| 2,830,274 | Rosen et al. | Apr. 8, 1958 |
| 2,875,355 | Petermann | Feb. 24, 1959 |
| 2,943,278 | Mattiat | June 28, 1960 |

OTHER REFERENCES

Elders: "New Development in Piezoelectric Ceramic 1–F Bandpass Filters," Proc. 1957 Electronics Components Symposium, May 1957, pages 33–37.